United States Patent [19]
Jarboe et al.

[11] Patent Number: 5,197,756
[45] Date of Patent: Mar. 30, 1993

[54] AIR BAG INFLATOR AND METHOD OF ASSEMBLY

[75] Inventors: Patrick G. Jarboe, Shelby Township, Macomb County; Steven W. Maurer, Fraser; Joseph J. Mihm, North Branch, all of Mich.

[73] Assignee: TRW Vehicle Safety Systems Inc., Lyndhurst, Ohio

[21] Appl. No.: 684,664

[22] Filed: Apr. 12, 1991

[51] Int. Cl.⁵ .................................................. B60R 21/16
[52] U.S. Cl. ........................................ 280/728; 280/741
[58] Field of Search ............... 280/728, 730, 731, 732, 280/740, 741

[56] References Cited

U.S. PATENT DOCUMENTS

| | | | |
|---|---|---|---|
| 3,801,126 | 4/1974 | Knight IV et al. | 280/150 |
| 3,817,552 | 6/1974 | Knight IV et al. | 280/150 |
| 3,880,447 | 4/1975 | Thorn et al. | 280/150 |
| 3,904,221 | 9/1975 | Shiki et al. | 280/150 |
| 4,103,806 | 8/1978 | White | 222/3 |
| 4,153,273 | 5/1979 | Risko | 280/740 |
| 4,158,696 | 6/1979 | Wilhelm | 422/166 |
| 4,191,392 | 3/1980 | Barnett | 280/740 |
| 4,200,615 | 4/1980 | Hamilton et al. | 422/166 |
| 4,332,398 | 6/1982 | Smith | 280/732 |
| 4,414,902 | 11/1983 | Strasser et al. | 102/531 |
| 4,687,640 | 8/1987 | Schillaci | 422/120 |
| 4,696,705 | 9/1987 | Hamilton | 149/21 |
| 4,698,107 | 10/1987 | Goetz et al. | 149/7 |
| 4,806,180 | 2/1989 | Goetz et al. | 149/5 |
| 4,890,860 | 1/1990 | Schneiter | 280/741 |
| 4,915,410 | 4/1990 | Bachelder | 280/732 |
| 4,938,501 | 7/1990 | Wipasuramonton | 280/743 |
| 4,964,654 | 10/1990 | Bishop | 280/741 X |
| 5,062,664 | 11/1991 | Bishop | 280/732 X |
| 5,088,764 | 2/1992 | Augustitus | 280/731 |

FOREIGN PATENT DOCUMENTS

58-110339 6/1983 Japan .

*Primary Examiner*—Richard A. Schacher
*Attorney, Agent, or Firm*—Calfee, Halter & Griswold

[57] ABSTRACT

A housing for an air bag inflator includes a tubular wall and gas dispensing nozzles extending through at least a portion of the wall. The tubular wall defines an inflator cavity for receiving a source of gas. The inflator housing includes a tongue formed in one piece with one end of the housing and projecting outwardly from the housing. The tongue includes a planar surface adapted to be coupled to a planar wall of a reaction device. The inflator housing further includes a sleeve attached to the tubular wall axially spaced from the tongue. The sleeve includes diametrically opposed flanges extending outward from the sleeve. Each of the flanges include a planar surface adapted to be coupled adjacent the planar wall of the reaction device. The tongue includes an alignment device which provides for properly aligning the inflator with the reaction device. According to another aspect of the invention, the inflator housing structure includes a pair of sleeves attached to axially spaced portions of the housing. A surface of at least one of the flanges includes an alignment device for providing proper alignment of the inflator with the air bag module.

30 Claims, 5 Drawing Sheets

AIR BAG INFLATOR AND METHOD OF ASSEMBLY

TECHNICAL FIELD

The present invention relates to a cylindrical inflator adapted to be incorporated into an air bag module, and to a method for forming the inflator.

BACKGROUND

A well known type of structure for a vehicle air bag module comprises an inflator and an air bag disposed within a container. The container is generally formed by a reaction device (e.g., a reaction can or reaction plate) and a cover coupled to the reaction device to complete an enclosure for the inflator and the air bag. The module is assembled by fastening the inflator and air bag to the reaction device, and then fastening the cover to the reaction device. The module is generally installed in a vehicle by coupling a part of the container (usually the reaction device) to a structural part of the vehicle. At the onset of a collision, the inflator produces an inert gas (e.g., nitrogen) which is directed under pressure against the air bag to force the air bag out of the container and into the passenger compartment.

One known type of inflator for a vehicle air bag module is shown in Wipasuramonton, U.S. Pat. No. 4,938,501. The inflator comprises a substantially cylindrical housing which encloses solid gas generating material. Gas dispensing nozzles are formed in the cylindrical housing and are disposed along a substantial portion of the length of the housing. The cylindrical housing is impact extruded and has a threaded boss extruded in one piece with and extending outwardly from an end wall of the housing. The boss has an asymmetrical design that enables the inflator to be located and aligned within the air bag module.

Other known types of cylindrical inflators for air bag modules are shown in Hamilton, et al, U.S. Pat. No. 4,200,615; Wilhelm, U.S. Pat. No. 4,158,696; Schneider, U.S. Pat. No. 4,890,860; and Risko, U.S. Pat. No. 4,153,273. In each of the foregoing patents, the cylindrical inflator is specifically designed to be side-loaded into a reaction can or other container for an air bag module using a threaded stud extending through an aperture in the container. Moreover, in each of these patents, the cylindrical inflator includes a separate alignment device, such as an alignment pin or key attached to the housing of the inflator, which properly aligns the cylindrical inflator in the module. With such structure, even after the threaded stud is inserted into the module aperture, the pin or key on the inflator housing must be properly aligned with a groove or notch in the module to orient the inflator properly with respect to the module. Thus, in order to automate the process of assembling a cylindrical inflator into a module, it would be necessary to automate the process of inserting the cylindrical inflator into the reaction can or other container for the module and orienting the inflator in the module to align the pin or key on the inflator housing with the groove or notch on the module.

Another known type of inflator for a vehicle air bag module is shown in Bachelder, U.S. Pat. No. 4,915,410. The inflator comprises an outer cylindrical housing adapted to be located in a cradle formed in a wall of the air bag container and maintained in the cradle by a spring clip which is attached to the container. An alignment pin on the inflator housing is designed to be received in a cooperating aperture in the cradle to orient the inflator properly in the cradle. However, in order to automate assembly of the Bachelder inflator into the module, it would be necessary to automate the process of: (i) orienting the inflator so that the alignment pin on the inflator will mate with the cooperating aperture in the cradle as the inflator is being inserted into the cradle, and (ii) thereafter securing the clip to the container to retain the inflator in the cradle.

Yet another more recent type of cylindrical inflator is shown in co-pending application Ser. No. 07/493,962 entitled, "Air Bag Module Construction and Assembly Technique", assigned to the assignee of the present invention. In a preferred embodiment of that application, a cylindrical inflator housing has flanges extending along the length of the housing. The inflator housing is formed by impact extrusion techniques, and the flanges are extruded in one piece with the inflator housing and form a reaction device integral with the inflator housing. The flanges have apertures which enable the inflator to be bolted or riveted to a structural part of the vehicle.

The design of the inflator of Ser. No. 07/493,962 is believed to be useful in facilitating the assembly of a cylindrical inflator with an air bag module. Specifically, the flanges on the inflator can be fastened to an air bag/cover subassembly to incorporate the inflator and reaction device into an air bag module. However, applicants believe that for longer cylindrical inflators, it may be difficult to extrude the flange in one piece with the inflator housing with enough dimensional precision to avoid significant finishing steps. Moreover, impact extruding a flange in one piece with an inflator housing means that in order to form inflator housings of differing lengths, the inflator housings may need to be struck from different extrusion dies. Still further, when the inflator is formed in one piece with a flange, it is still necessary to properly align the inflator in the module in order to automate assembly of the module.

SUMMARY OF THE INVENTION

The present invention provides a new and useful cylindrical inflator adapted to be incorporated into an air bag module, and to a new and useful method for forming the inflator. The cylindrical inflator is designed to be simply and efficiently formed and incorporated into an air bag module. Moreover, the cylindrical inflator is believed to be capable of being incorporated into a module by mass production (preferably automated) assembly techniques. Still further, the cylindrical inflator is designed to enable simple and prompt detection of misalignment of the inflator during incorporation of the inflator into an air bag module.

According to one preferred form of the invention, a cylindrical inflator housing is impact extruded from lightweight aluminum. The inflator has a tongue extruded in one piece with one end of the housing. The tongue has a planar surface which is adapted to be coupled, e.g., bolted or riveted, to a planar surface of another component of an air bag module. The tongue also includes an integrally formed device for causing a designed misalignment of the inflator if the inflator is improperly oriented with respect to other components of the air bag module during assembly of the module. This device comprises a geometrically contoured surface formed opposite the planar surface of the tongue. During assembly of the inflator with other components of the module, if the inflator is improperly oriented in the module, the device causes a predetermined form of misalignment between the inflator and the reaction device of the air bag module. The predetermined form of misalignment is designed to be readily detected, either visually or preferably by automatic inspection devices, thereby to enable prompt and efficient reorientation of the inflator during the assembly process.

Additionally, according to a preferred form of the invention, a sleeve is linearly extruded separate from the inflator and attached to the cylindrical housing of the inflator at a location which is axially spaced from the tongue. The sleeve includes a pair of opposed flanges extending diametrically outward from the sleeve. Each of the flanges has a planar surface which is adapted to be coupled, e.g., bolted or riveted, to a planar surface of a reaction device of an air bag module. The planar surfaces of the flanges are substantially co-planar with the planar surface of the tongue. Thus, the co-planar surfaces on the flanges and the tongue can be bolted or riveted to the reaction device by mass production (and preferably automated.) techniques.

According to another form of the invention, the inflator includes a pair of sleeves formed separate from the inflator housing and attached to axially spaced portions of the housing. Each sleeve includes a pair of integrally formed, opposed flanges which project diametrically outward from the sleeve. The sleeves are adapted to be attached to the inflator housing such that cooperating planar surfaces on the flanges of each sleeve extend in a substantially co-planar relationship. Thus, co-planar surfaces or the flanges can be bolted or riveted to a planar surface of the reaction device by mass production (preferably automated assembly techniques. Moreover, at least one of the sleeves includes an integrally formed device for causing a predetermined form of misalignment between the inflator and the reaction device if the inflator is improperly oriented with respect to the reaction device during assembly of the module. As explained above, such a device enables simple and efficient visual (and preferably automated) detection of a misaligned inflator and thereby allows immediate prompt and efficient reorientation of the inflator during the assembly process.

Accordingly, it is a basic object of the present invention to provide a cylindrical inflator designed to be simply and efficiently formed and incorporated into an air bag module. It is another object of the invention to provide a cylindrical inflator housing structure which includes an integrally formed device for causing a designed misalignment if the inflator is improperly oriented relative to another component of the air bag module. The device enables prompt and efficient detection of misalignment of the inflator and thereby allows for prompt and efficient reorientation of the inflator during the manufacturing process.

Further objects and advantages of the present invention will become further apparent from the following detailed description and the accompanying drawings.

DETAILED DESCRIPTION OF THE PREFERRED EMBODIMENT

Referring to the drawings, FIGS. 1-9 illustrate an inflator housing structure for an air bag restraint system. The inflator housing, indicated generally at 100, comprises a container 102 which defines a cavity 103 for a source of inert gas, such as nitrogen. The source of gas is a solid gas generating material (shown schematically at 104 in FIG. 2), although a container of gas under pressure could also be used. Because a solid gas generating material is used, a filter structure (shown schematically at 105 in FIG. 2) is also included in the cavity 103. The solid gas generating material 104 can be any known solid gas generating material used with vehicle air bags. A preferred gas generating material is made primarily of sodium azide and iron oxide, as described in U.S. Pat. Nos. 4,696,705 and 4,698,107, which are assigned to the assignee of this invention.

As discussed in these patents, the solid gas generating material 104 is preferably formed into grains which are stacked adjacent each other in the container 102. The filter structure 105 can be made of known filter materials (e.g. wire mesh, steel wool, fiberglass or ceramic felt-like material) in a configuration which is suitable for use with the particular gas generating material. The specific nature of the solid gas generating material 104 and the filter structure 105 does not form any part of the present invention, and it will not be described further herein.

The container 102 has a substantially cylindrical main wall 106 which circumscribes a longitudinal axis 107. The length of the main wall 106 is substantially greater than the diameter of the cylindrical wall. The container 102 includes an end wall 110 preferably formed in one piece with one longitudinal end of the cylindrical main wall 106. The other longitudinal end of the cylindrical main wall 106 defines an opening, indicated generally at 112. An end cap 114 is attached to the main wall 106 to close the opening 112 after the solid gas generating material 104 and filter structure 105 have been inserted into the container 102. A preferred construction for a container is described in U.S. Pat. No. 4,938,501, which is assigned to the assignee of this invention.

The end wall 110 of the container 102 includes a tongue 120 preferably formed in one piece with and extending from the wall 110. The tongue 120 is used to locate and align the inflator 100 with a reaction device of an air bag module, as discussed herein in more detail.

Figure 1:
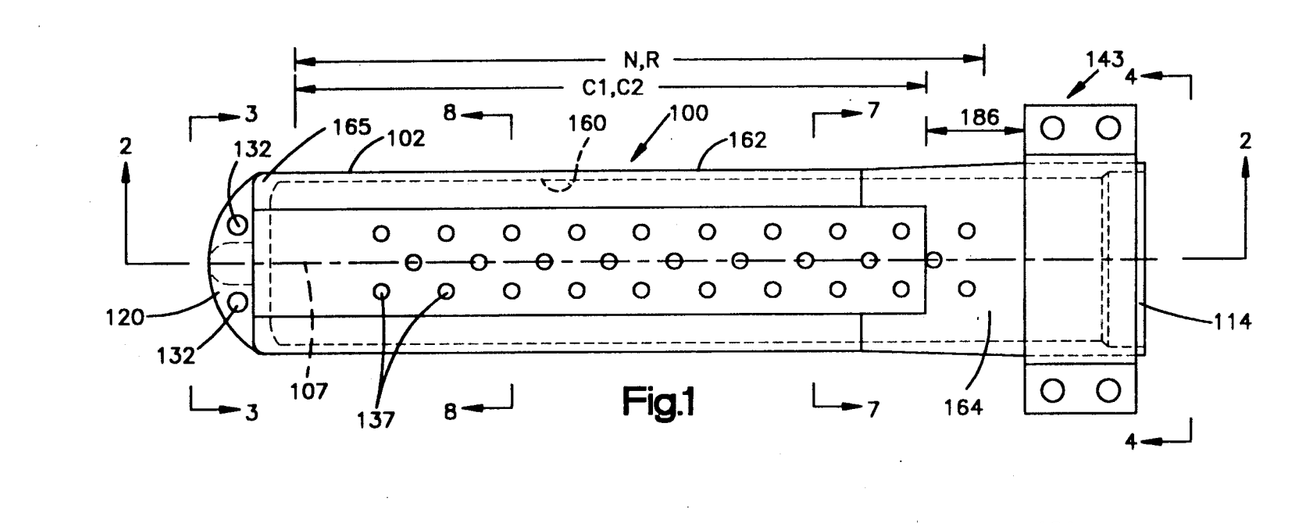
FIG. 1 is a top plan view of an inflator housing structure constructed according to the principles of the present invention.
Figure 2:
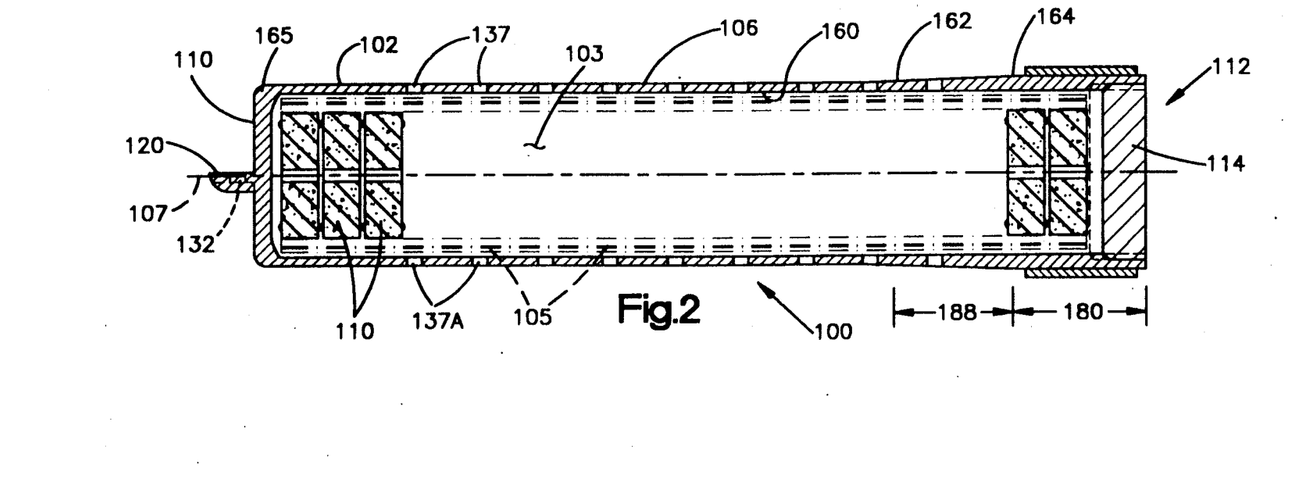
FIG. 2 is a cross-sectional view of the inflator housing structure taken substantially along the plane described by the lines 2—2 of FIG. 1.
Figure 3:
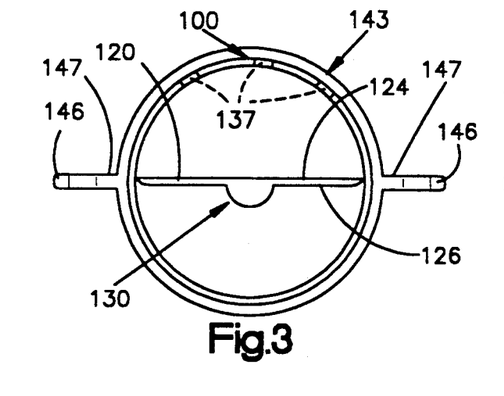
FIG. 3 is a front end view of the inflator housing structure taken substantially along the plane described by the lines 3—3 of FIG. 1.

Referring now to FIGS. 1-3, the tongue 120 has a geometric contour in profile. More particularly, the tongue 120 includes a substantially planar top surface 124 and a generally parallel bottom surface 126. For a rear-loaded inflator, i.e., an inflator which is attached from the outside, rear of an air bag module, the bottom surface 126 of the tongue has an alignment device, indicated generally at 130. The alignment device 130 comprises a contoured surface having a substantially semicircular cross-sectional profile which extends downwardly from the bottom surface 126 of the tongue.

Figure 3A:
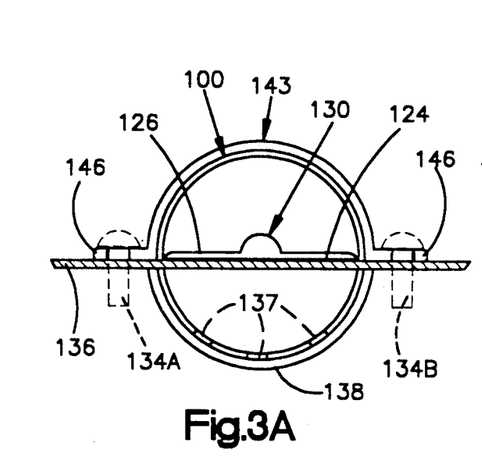
FIG. 3A is a front end view of the inflator housing structure of FIG. 3, illustrating proper alignment of the tongue with a wall of the reaction device.

As shown most clearly in FIG. 1, the top surface 124 of tongue 120 includes attachment apertures 132, e.g., bolt or rivet holes, which enable the inflator 100 to be coupled to the reaction device of an air bag module. As illustrated in FIG. 3A, fasteners 134A, 134B, e.g., bolts or rivets, are inserted through the apertures 132 and apertures (unnumbered) in a wall 136 of a reaction device to couple the top surface 124 of the tongue 120 substantially adjacent a planar surface of the wall 136. Other conventional, planar fastener accessories, e.g., washers, brackets, etc., can be interposed between the tongue 120 and the wall 136.

When the inflator is correctly oriented relative to the reaction device, the gas dispensing nozzles, indicated generally at 137, in the main wall 106 are directed inwardly into the air bag module to inflate a folded air bag 138. Moreover, in a correctly aligned inflator, the top surface 124 of the tongue 120 is adapted to be coupled to the adjacent planar surface of the wall 136 of the reaction device. The tongue 120 lies substantially flat against the wall of the reaction device and the inflator nozzles 137 are properly aligned within the air bag 138. Moreover, the fasteners 134A, 134B are properly seated with respect to the wall 136 of the reaction device.

Figure 3B:
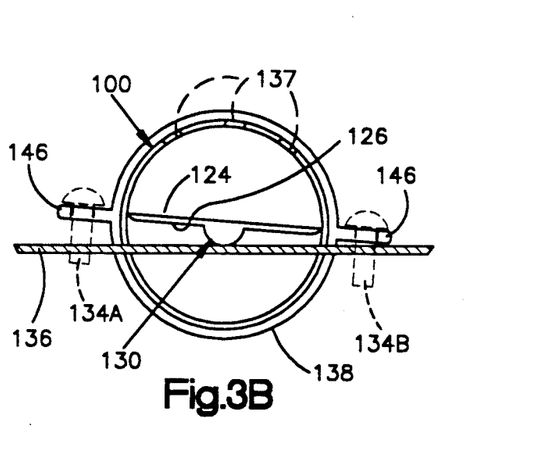
FIG. 3B is a front end view of the inflator housing structure of FIG. 3, illustrating misalignment of the tongue with a wall of a reaction device.

However, if the inflator is improperly oriented with the air bag module, i.e., the nozzles 137 are directed outwardly from the reaction device as illustrated in FIG. 3B, then the alignment device 130 will effectively indicate a misalignment. To this end, the alignment device 130 will create a separation between the tongue 120 and the planar wall 136 of the reaction device when coupling is attempted. For example, FIG. 3B illustrates an improperly oriented inflator with a pair of fasteners 134A, 134B attempting to secure the inflator to the reaction device. Fastener 134A, however, is improperly seated relative to the planar wall 136 of the reaction device due to the separation caused by alignment device 130 and the planar wall 136. Such a misalignment can be detected promptly and efficiently by either manual or automated inspection processes, and the inflator can thereby be properly aligned with the wall of the reaction device.

Figure 3C:
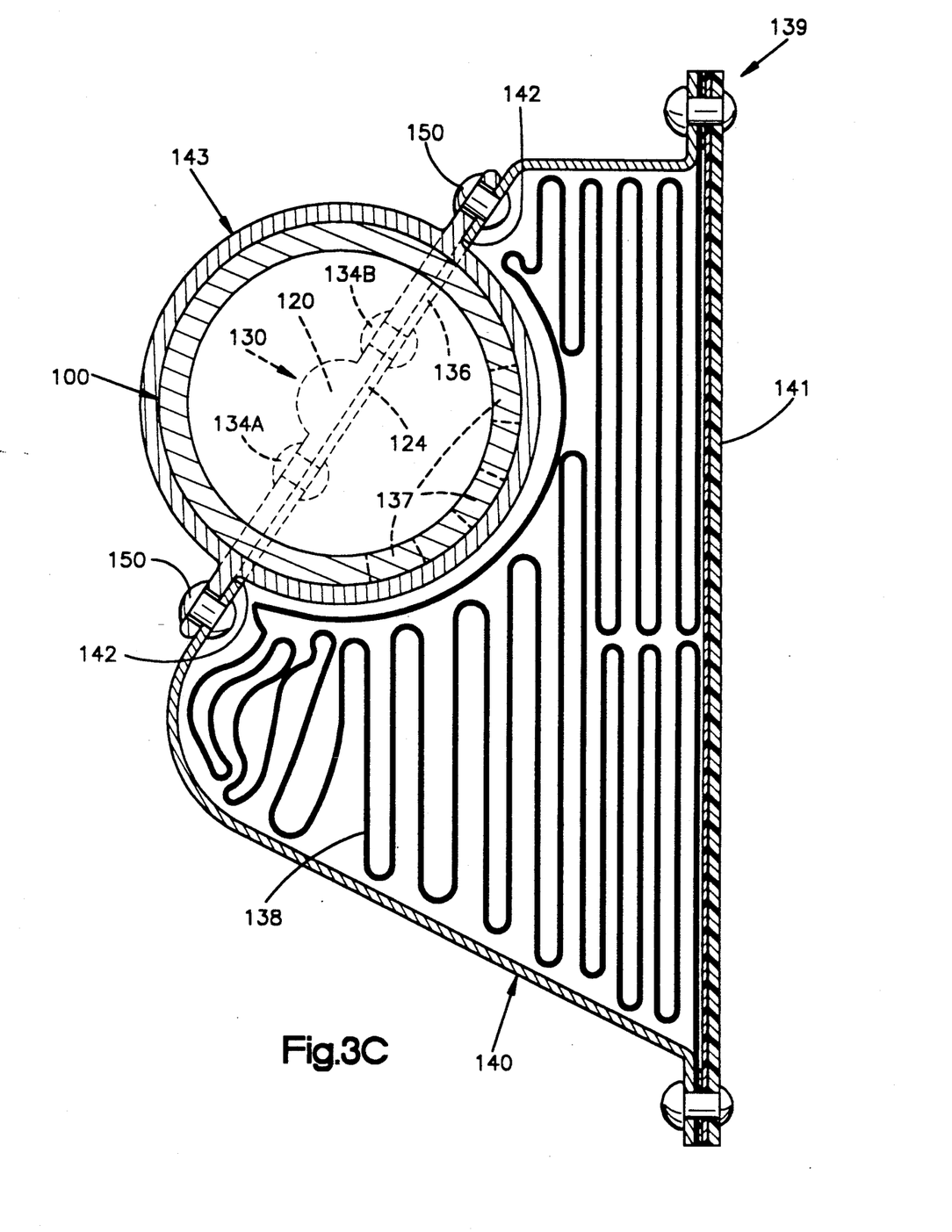
FIG. 3C is a side cut away view of an air bag module illustrating the method for coupling the inflator to the air bag module.
Figure 4:
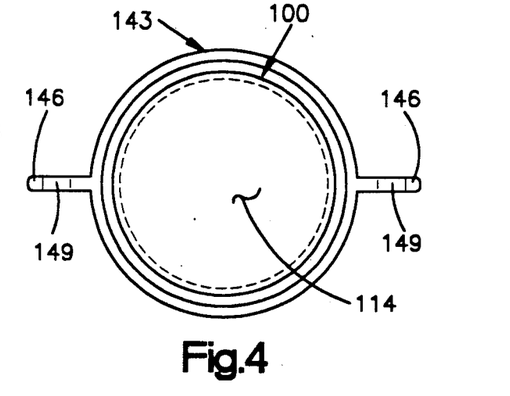
FIG. 4 is a rear end view of the inflator housing structure taken substantially along the plane described by the lines 4—4 of FIG. 1.
Figure 5:
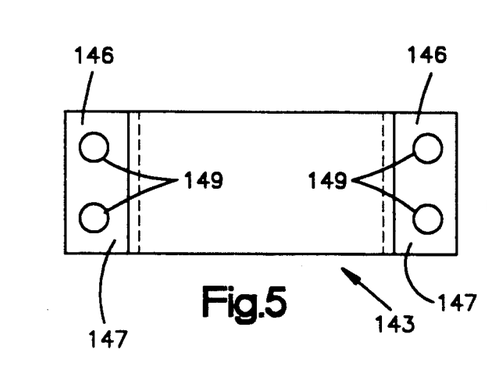
FIG. 5 is a top plan view of a sleeve constructed according to the principles of the present invention.

The alignment device 130 is designed for use in both front loaded and back loaded air bag modules. For back loaded inflators, as illustrated in FIG. 3C, the air bag module 139 is typically preassembled with a folded air bag 138 located within the reaction device at 140 and at least partially enclosed with a cover 141. The inflator 100 is at least partially inserted within an inflator aperture 142 formed in the planar wall 136 of the reaction device 140 and is coupled to the wall 136. A preferred reaction device for an air bag module is shown in co-pending application entitled "Air Bag Module", filed Feb. 19, 1991 and assigned to the assignee of the present invention. The remaining components of the air bag module form no part of the present invention and will not be discussed hereinafter.

Similarly, as will be obvious to one skilled in the art, for front loaded inflators, i.e., inflators which are attached from the inside of the reaction device of the air bag module, the alignment device 130 will be formed in the top surface 124 of tongue 120. The device in a front-loaded inflator would similarly provide an indication of misalignment when the inflator is improperly oriented with respect to the air bag module.

The inflator housing structure also includes a sleeve, indicated generally at 143 in FIGS. 1-6, that is adapted to facilitate coupling of the inflator 100 to the reaction device 140 of an air bag module 139. To this end, as shown in more detail in FIGS. 5, 6, the sleeve 143 comprises a tubular section having an inner, annular circumferential surface 144 and an outer, annular circumferential surface 145. The inner surface 144 has a diameter which is substantially identical to the outer diameter of container 102 of the inflator structure and, in particular, to the outer diameter of the container 102 proximate the open end 112.

The sleeve 143 is preferably extruded from 6061 aluminum or other appropriate material in an elongated tubular shape by conventional linear extrusion techniques. The techniques for linearly extruding a tubular part such as the sleeve 143 of the invention are well known to those of ordinary skill in the aluminum fabricating arts. The linearly extruded tube can be cut to appropriate lengths to provide individual sleeves for attachment to an inflator structure.

The sleeve 143 is adapted to be integrally connected to the cylindrical main wall 106 of inflator housing 100, as illustrated in FIG. 1. In particular, the sleeve is connected at a location axially spaced from the tongue 120, and preferably proximate the open end 112 of the inflator housing. The sleeve 143 can be connected to the inflator housing 100 by press fit, shrink fit, or tongue and groove techniques, which are all conventional attachment techniques known to those in the art. For example, for a tongue and groove attachment method, the inside surface 144 of sleeve 143 can have a longitudinally extending tongue, which would be adapted to be received in a longitudinally extending groove formed in the container 102.

The sleeve 143 includes a pair of diametrically opposed and outwardly projecting flanges 146. Each flange includes a top surface 147 and a bottom surface 148. As shown in FIG. 1, the top surface 147 of each flange includes attachment apertures 149, e.g., bolt or rivet holes, which extend through the flange. The attachment apertures 149 enable the sleeve 143 to be coupled to the reaction device of an air bag module. Fasteners 150, e.g., bolts or rivets, extend through the attachment apertures 149 in flanges 146 and cooperating apertures (not numbered) in wall 136 of the module housing 140. The sleeve 143 is preferably attached to the inflator housing 100 such that top surface 147 of each flange 146 extends outwardly along the same plane as the top surface 124 of tongue 120 (see e.g., FIG. 3). Such an attachment allows the sleeve and tongue to be coupled to a common, planar wall of the reaction device. However, the top surface 147 of each flange 146 can also extend outwardly in an offset, but parallel relation to the top surface 124 of the tongue 120, if necessary, to enable proper coupling of the inflator to the reaction device, particularly if the wall of the reaction device is not planar around the inflator aperture 142. Moreover, other conventional planar fastener accessories, e.g., washers, brackets, etc., can be interposed between each flange and the planar wall of the reaction device.

The sleeve 143 in the preferred embodiment is symmetrical, that is, either planar surface of the flanges on the sleeve can be coupled to the wall of the reaction device, depending on whether the inflator is front-loaded or back-loaded to the air bag module. Further, the sleeve can be attached to an inflator irrespective of the length of the inflator (e.g., a driver side or passenger side inflator).

Figure 7:
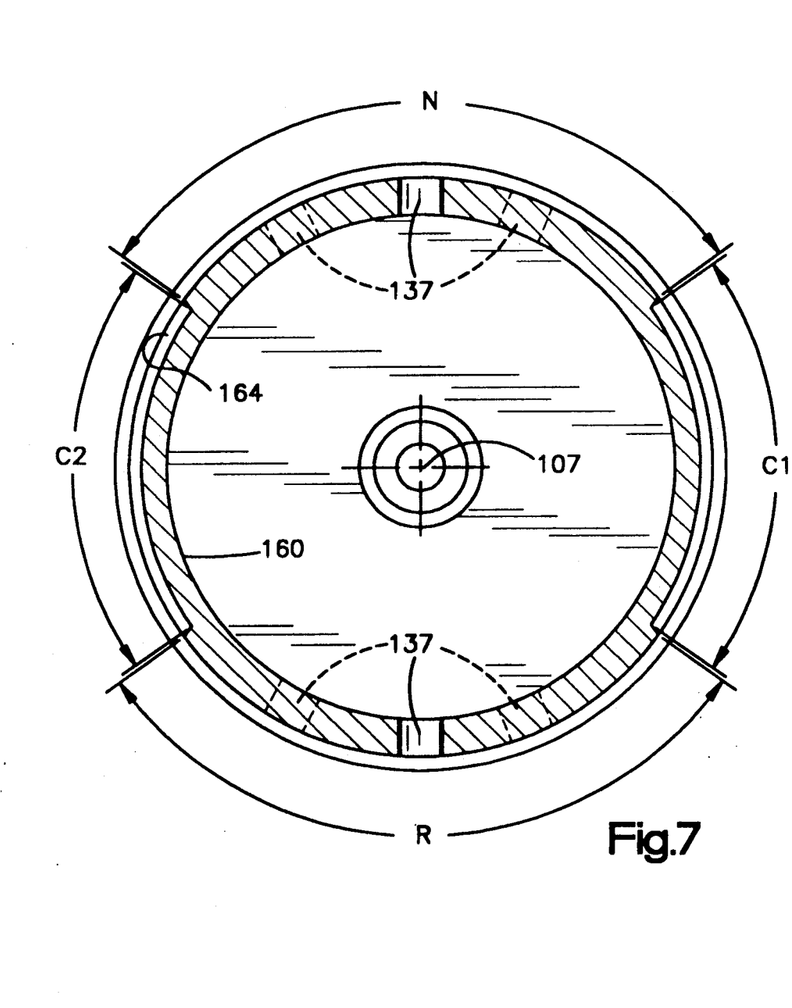
FIG. 7 is an enlarged sectional view of the inflator of FIG. 1, taken substantially along the planes described by the lines 7—7 of FIG. 1, with materials inside the inflator housing omitted.

The main wall 106 of the container 102 has a substantially tubular shape with an inside surface 160 and an outside surface 162. The inside surface 160 of the main wall 106 is a relatively smooth, cylindrical surface with a constant diameter. The outside surface 162 of the main wall 106, however, has a complex geometry. In particular, the outside surface of the main wall 106 has a nozzle area N, a reaction area R and a pair of connecting areas C1, C2. A series of gas dispensing nozzles 137 extend radially through the main wall 106 of the container 100 in the nozzle area N. The nozzle area N extends longitudinally along a selected longitudinal portion of the main wall 102 (see e.g. FIG. 1). As seen in FIG. 7, the nozzle area N also partially circumscribes the longitudinal axis 107, i.e., the nozzle area N extends over a selected circumferential portion of the main wall 106.

The reaction area R on the main wall 106 is approximately coextensive with the nozzle area N along the longitudinal axis 107 and extends over a selected circumferential portion of the main wall 106 disposed diametrically opposed to the nozzle area N. Additional gas dispensing nozzles 137A can also be located in the reaction area R and extend radially through the main wall 106 of the container 100. These gas dispensing nozzles 137A enable excess gas to be directed out of the inflator but away from the air bag for temperature compensation purposes. Moreover, an annular segment 164 of the main wall 106 (see FIGS. 1, 2, 7) is integral with and forms part of each of the nozzle and reaction areas N, R.

The pair of connecting areas C1, C2 extend between the nozzle area N and reaction area R. As seen from FIG. 1, the connecting areas C1, C2 are coextensive along the longitudinal axis 107. Further, the length of each of the connecting areas C1, C2 is slightly less than the length of the nozzle and reaction areas N, R.

The thickness of the main wall 106 in the nozzle and reaction areas N, R is greater than the thickness of the main wall 106 in the connecting areas C1, C2. During operation of the inflator, gas is generated within the container 102 and expelled through the nozzles 137, 137A. The pressure of the gas and the thrust forces produced in the housing as the gas is expelled through the nozzles 137, 137A act on the main wall 106 of the housing. The main wall 106 is relatively thick in the nozzle and reaction areas N, R, to withstand the gas pressure and the thrust forces, while relatively thin in the connecting areas C1, C2, to minimize the weight of the inflator.

In addition to the nozzle and reaction areas, the longitudinal ends of the inflator housing must be designed to resist relatively high pressures during inflation. Thus, as seen from FIG. 2, the thickness of the end wall 110 of the container 102 is greater than the thickest part of the main wall 106. Moreover, the container 102 includes an annular wall portion 165 which connects the main wall 106 and the end wall 110, wherein the thickness of the annular wall portion 165 is at least as great as the thickness of the end wall 110.

Figure 6:
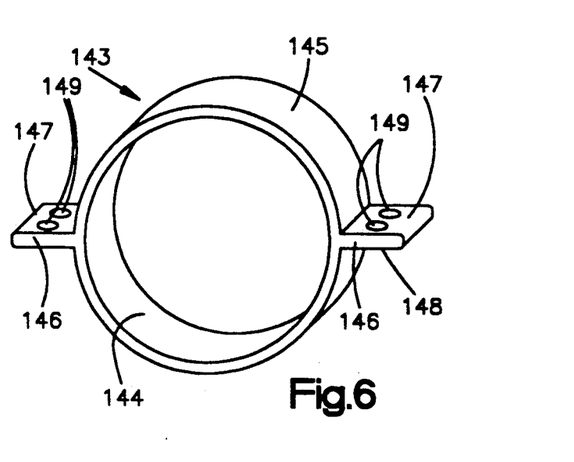
FIG. 6 is a perspective view of a sleeve constructed according to the principles of the present invention.

The opening 112 of the container 102 has a relatively thick, annular portion 180 circumscribing the longitudinal axis 107. The relatively thick wall portion 180 has a relatively constant outer diameter, which is substantially the same as the inner diameter of the sleeve 140 (FIG. 6). The wall portion 180 has internal threads (not shown) for receiving external threads (not shown) on the end cap 114, to enable the end cap 114 to be securely attached to the container 102 after the gas generating material 104, filter structure 105 and other appropriate internal components, have been inserted.

The container 102 for the inflator housing structure 100 is preferably cold formed by impact extrusion. The preferred material is 2014 aluminum, which is a lightweight, high strength aluminum and well known as a material that can be readily formed by conventional impact extrusion techniques. The techniques for impact extruding a cup-like part such as the container 102 of the invention are well known to those of ordinary skill in the aluminum fabricating arts. The presses, tooling, and lubricant for impact extruding 2014 aluminum are all well known. Applicant believes that it would be possible to form an inflator housing out of other lightweight material, such as 6061 aluminum. 6061 aluminum is lower in strength than 2014 aluminum, but is more readily formable by impact extrusion techniques. The extrusion is preferably accomplished by reverse extrusion, which is a well known technique for impact extruding aluminum and should not require further explanation.

During the extrusion process, the end wall 110 and tongue 120 are formed in one piece with the main wall 106. The die for the extrusion is preferably a solid, single piece die with a profile matching the outer profile of the container (including the profile of the alignment device 130 on tongue 120). Such die form is well known to those in the aluminum fabricating arts and should not require further explanation.

After the inflator container 102 is formed by the impact extrusion techniques discussed above, the nozzles 137, 137A are drilled in the nozzle area N and the reaction area R, and the threads are formed on the inside of the annular portion 180 of the container 102. The threads are designed to match the external threads on the end cap 114 to allow the end cap 114 to be attached to the main wall 106. The end cap 114 includes appropriate outwardly extending surfaces (not shown) which can be engaged by a wrench or other tool to enable the end cap 114 to be tightened to the container 102.

Figure 8:
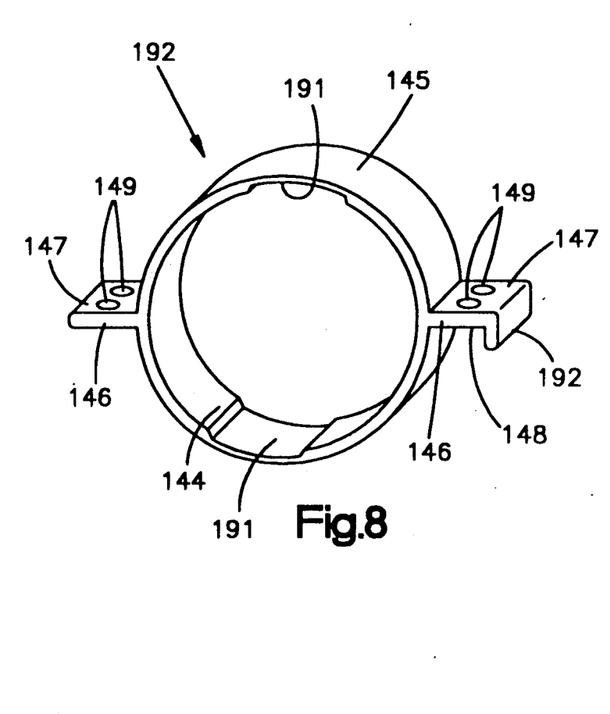
FIG. 8 is a perspective view or a sleeve constructed according to a second embodiment of the invention.

According to a second embodiment of the present invention, the inflator housing can be coupled to the reaction device of an air bag module using a pair of sleeves of the type indicated generally at 143 in FIG. 6 and at 190 in FIG. 8, instead of the tongue and sleeve combination described above in the preferred embodiment. For simplicity and clarity of explanation, the same reference numerals will be used to describe the same elements of the sleeve in FIG. 8 as were used previously.

Figure 9:
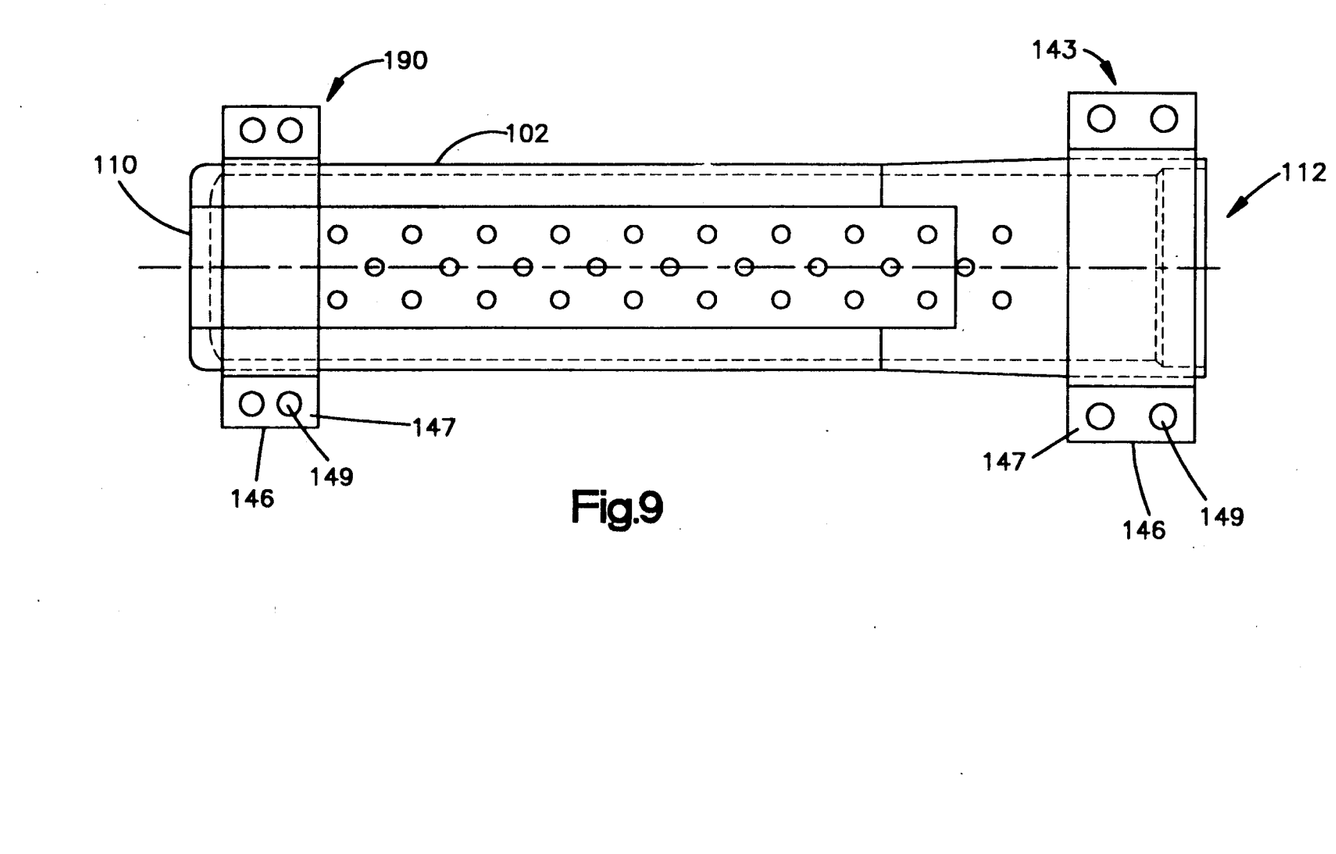
FIG. 9 is a top plan view of an inflator housing structure constructed according to a second embodiment of the invention.

The sleeves 143, 190 are formed according to the principles described above, and are attached to axially spaced portions of the inflator housing using the above described attachment techniques, e.g., shrink fit, press fit or tongue and groove, as illustrated in FIG. 9. In particular, sleeve 143 is attached proximate the open end 112 of the inflator housing; while sleeve 190 is attached proximate the end wall 110 of the inflator housing. Sleeve 190 has a pair of inner grooves 191 (FIG. 8) which are formed during the extrusion process and correspond to the outer geometric configuration of the inflator housing. The sleeves 143, 190 are attached to the container 102 such that the top surfaces 147 of each flange on the pair of flanges extend substantially co-planar to one another. Apertures 149 in the flanges 146 enable the inflator to be coupled to a planar wall of the reaction device of the air bag module using the same techniques as described above with respect to a single sleeve.

Further, as shown in FIG. 8, the bottom surface 148 of at least one of the flanges on sleeve 190 can have an alignment device formed in one-piece therewith, such as by conventional linear extrusion techniques. For example, the bottom surface 148 of the flange can have a geometrically contoured surface similar to the alignment device 130 of the tongue in FIG. 3, which is formed during the extrusion process. In particular, as shown in FIG. 8, the bottom surface 148 can include a downwardly and longitudinally extending nub, as indicated at 192. The nub 192 on surface 148 indicates the proper alignment of the inflator housing with the air bag module by preventing coupling of surface 148 of at least one of the flanges on sleeve 190 to a planar wall of the reaction device. Moreover, the nub 192 can be integrally formed with either the top or bottom surface, 147, 148, depending on whether the inflator is a back-loaded or front-loaded inflator. For example, for the back-loaded inflator, the nub 192 might be formed with the bottom surface 148 of a flange, while for a front-loaded inflator, the nub 192 might be formed on the top surface 147. In either case, the nub 192 will prevent coupling a misaligned inflator to the reaction device of an air bag module, and will allow reorientation of the inflator during the assembly process.

Accordingly, there has been described above an inflator housing structure and a method for assembling the inflator to a reaction device of an air bag module which is simple, convenient and particularly lends itself to automated manufacturing of the air bag module. Further, there has been described above a preferred inflator housing structure having integral alignment device which provides for prompt and efficient detection of misalignment of the inflator with the air bag module and thereby allows for prompt and efficient reorientation of the inflator during the air bag manufacturing process. However, with the present disclosure in mind, it is believed that obvious alternatives to the preferred embodiment will become apparent to those of ordinary skill in the art.

What is claimed is:

1. An air bag inflator structure comprising:
    a housing member having a substantially cylindrical wall circumscribing a longitudinal axis, said housing member including gas dispensing nozzles extending through at least a portion of said cylindrical wall,
    said housing member also having an end wall integral with one longitudinal end of said substantially cylindrical wall, said cylindrical wall and said end wall co-operating to define a cavity for a gas generant,
    said housing member further having a tongue integral with and projecting outwardly from said end wall, said tongue adapted to be coupled to a surface of a component of an air bag module; and
    a sleeve at least partially surrounding and connected with said cylindrical wall at a location axially spaced from said end wall, said sleeve including at least one flange extending radially outwardly from said cylindrical wall, said at least one flange adapted to be coupled to a surface of the component of the air bag module.

2. An inflator structure as in claim 1, wherein each of said tongue and said at least one flange includes a planar surface which can be coupled to a planar surface of the component of the air bag module.

3. An inflator structure as in claim 2, wherein said planar surface of said at least one flange is co-planar with respect to said planar surface of said tongue.

4. An inflator structure as in claim 2, wherein said planar surface of said at least one flange is parallel to said planar surface of said tongue.

5. An inflator structure as in claim 1, wherein said tongue is formed in one piece with said end wall.

6. An inflator structure as in claim 5, wherein said at least one flange is formed in one piece with said sleeve.

7. An inflator structure as in claim 6, wherein said one end of the housing is closed by a wall formed in one piece with said end wall.

8. An inflator structure as in claim 1, wherein said sleeve comprises (a) a cylindrical member completely circumferentially surrounding a portion of said cylindrical wall at said location which is axially spaced from said end wall, and (b) a pair of diametrically opposed flanges extending outwardly from said cylindrical member, said flanges of said sleeve having co-planar surfaces which can be coupled to a planar surface of the component of the air bag module.

9. An inflator structure as in claim 8, wherein said tongue further includes a geometrically contoured surface, said surface configured to provide a predetermined amount of misalignment between said inflator structure and a planar surface of the component of an air bag module when said geometrically contoured surface is disposed substantially adjacent the planar surface of the component of the air bag module, such misalignment being identifiable to prevent improper coupling of the inflator to the planar surface of the component.

10. An inflator structure as in claim 9, wherein said geometrically contoured surface includes a substantially planar surface portion and a surface portion extending out of the plane of said planar surface portion.

11. An inflator structure as in claim 10, wherein said geometrically contoured surface comprises a pair of co-planar surface portions and a rounded surface portion extending between and interconnecting said planar surface portions.

12. An apparatus comprising:
    a reaction device for an air bag module, and an air bag inflator coupled to said reaction device,
    said reaction device comprising a wall having first and second surfaces and a slot extending therethrough, said inflator comprising a cylindrical housing defining an interior cavity from which gas can be discharged, said cylindrical housing having gas dispensing nozzles formed therein, said cylindrical housing extending partially through said slot with said gas dispensing nozzles oriented so as to direct gas from the inflator away from one of the surfaces of said wall, said inflator having attachment structure extending away from said cylindrical housing, said attachment structure having a first surface with a configuration which is similar to the configuration of a predetermined portion of one of the surfaces of the wall of the reaction device and which causes the inflator to be located in a predetermined alignment with said reaction device when the first surface is disposed against the predetermined portion of the one surface of the wall of said reaction device, thereby to enable the attachment structure to be coupled to said wall of the reaction device with the inflator in the predetermined alignment therewith, said attachment structure also including a second surface with a configuration which is dissimilar to the configuration of the predetermined portion of the one surface of the wall of the reaction device when said second surface is disposed against said predetermined portion of the one surface of the wall of the reaction device, thereby to prevent said inflator from being in said predetermined alignment with said reaction device.

13. An apparatus as in claim 12, wherein said attachment structure has at least one planar surface coupled to a planar wall of the reaction device in predetermined alignment therewith.

14. An apparatus as in claim 13, wherein said cylindrical housing includes an end wall formed in one piece with said cylindrical housing.

15. An apparatus as in claim 14, wherein said attachment structure includes a tongue formed in one piece with said end wall of said cylindrical housing.

16. An apparatus as in claim 15, wherein said tongue further includes (a) a geometrically contoured surface configured to provide a predetermined amount of misalignment between said inflator and the planar wall of the reaction device, and (b) a planar surface providing an alignment surface for coupling the tongue to the planar wall of the reaction device.

17. An apparatus as in claim 16, wherein said geometrically contoured surface includes a substantially planar surface portion and a surface portion extending out of the plane of said planar surface portion.

18. An apparatus as in claim 12, wherein said attachment structure includes a sleeve having at least one flange extending radially outward from said housing, said flange having a planar surface coupled to a planar wall of the reaction device.

19. An apparatus as in claim 18, wherein said sleeve has a pair of opposed flanges extending radially outward from said sleeve.

20. An apparatus as in claim 19, wherein each of said flanges includes a planar surface, said planar surface being coupled to the planar wall of the reaction device.

21. An air bag inflator structure, comprising:
a housing having a cylindrical wall with at least one gas dispensing nozzle, said cylindrical wall having a first end and a second end, said cylindrical wall, first end and second end at least partially defining an inflator cavity for receiving a source of gas, said housing including a pair of sleeves surrounding respective portions of said cylindrical wall, said pair of sleeves being axially spaced at preselected locations along the cylindrical wall, each sleeve having at least one attachment flange formed in one piece therewith, said at least one attachment flange having respective surfaces adapted to be coupled to a surface of a component of an air bag module.

22. An air bag inflator structure as in claim 21, wherein at least one of said flanges includes a planar surface and a geometrically contoured surface, said planar surface being coupled to a planar surface of the component of the air bag module when said inflator housing is in a predetermined alignment therewith, and said geometrically contoured surface producing a designed amount of misalignment between said flanges and the planar wall of the component when the inflator housing is not in said predetermined alignment.

23. An inflator structure as in claim 22, wherein said geometrically contoured surface includes a substantially planar surface portion and a surface portion extending out of the plane of said planar surface portion to produce the desired amount of misalignment between the flanges and the planar wall of the component when the inflator housing is not in said predetermined alignment.

24. An inflator structure as in claim 21, wherein each of the sleeves has a pair of integrally formed, opposed attachment flanges.

25. An air bag inflator structure comprising:
a housing having a cylindrical wall, a first end, and a second end opposite said first end, said housing having gas dispensing nozzles extending through at least a portion of said cylindrical wall, said cylindrical wall at least partially defining an inflator cavity for receiving a source of gas, said cylindrical wall including an attachment structure for attaching said housing to a wall of a reaction device, said attachment structure including an attachment surface and an opposite, geometrically contoured surface, said geometrically contoured surface having a configuration which is dissimilar to the surface of the wall of the reaction device and which provides a designed misalignment of said attachment structure with the wall of the reaction device when the geometrically contoured surface is disposed against the wall of the reaction device to prevent the housing from being coupled to the reaction device in a predetermined alignment therewith, and said attachment surface having a second surface with a configuration which is similar to the surface of the wall of the reaction device and which provides a designed alignment of said attachment structure with the wall of the reaction device when the second surface is disposed against the wall of the reaction device to enable the housing to be coupled to the reaction device in the predetermined alignment therewith.

26. An inflator structure as in claim 25, wherein said attachment structure includes first and second attachment surfaces, said attachment surfaces extending in a substantially co-planar relationship.

27. An inflator structure as in claim 25, wherein said geometrically contoured surface includes a substantially planar surface portion and a surface portion extending out of the plane of said planar surface portion.

28. A method for assembling an air bag inflator to a reaction device of an air bag module, comprising:

forming a cylindrical inflator housing with gas dispensing nozzles extending over at least a portion of the inflator housing and a tongue extending outwardly from one end of the inflator housing.

forming a tubular sleeve separate from said inflator housing with an inner diameter substantially same as an outer diameter of said inflator housing and with flanges extending outwardly from the sleeve, connecting the sleeve to the inflator housing spaced from the one end of the inflator housing, and orienting in a single plane a planar surface of the tongue and a planar surface of each flange.

29. A method as in claim 28, further including:

locating the planar surface of the tongue adjacent a planar wall of the reaction device, locating the planar surfaces of the flanges adjacent the planar wall of the reaction device, and coupling said tongue and said flanges of said sleeve to the planar wall of the reaction device.

30. An air bag inflator structure comprising:

a housing member having a substantially cylindrical wall circumscribing a longitudinal axis, said housing member including gas dispensing nozzles extending through at least a portion of said cylindrical wall, said housing member also having an end wall integral with one longitudinal end of said substantially cylindrical wall, said cylindrical wall and said end wall co-operating to define a cavity for a gas generant, said housing member further having a tongue integral with and projecting outwardly from said end wall, said tongue having a first surface with a configuration which is similar to the surface configuration of a selected first portion of an air bag module so that said first surface of said tongue can be disposed against the selected first portion of the air bag module when the air bag inflator is coupled to the air bag module; and a sleeve at least partially surrounding and connected with said cylindrical wall at a location axially spaced from said end wall, said sleeve including at least one flange extending radially outwardly from said cylindrical wall, said at least one flange having a second surface with a configuration which is similar to the surface configuration of a selected second portion of the air bag module so that said second surface of said at least one flange can be disposed against the selected second portion of the air bag module when the air bag inflator structure is coupled to the air bag module.

* * * * *

UNITED STATES PATENT AND TRADEMARK OFFICE
CERTIFICATE OF CORRECTION

PATENT NO.   :   5,197,756

DATED        :   March 30, 1993

INVENTOR(S)  :   Jarboe, et al.

It is certified that error appears in the above-identified patent and that said Letters Patent is hereby corrected as shown below:

Col. 11, Line 26: after "reaction device" insert --and which provides a designed misalignment between the inflator and the wall of the reaction device--

Signed and Sealed this

Sixteenth Day of November, 1993

Attest:

BRUCE LEHMAN

Attesting Officer    Commissioner of Patents and Trademarks